United States Patent [19]

Rozanc

[11] 4,313,697

[45] Feb. 2, 1982

[54] MINE ROOF SUPPORT PLATE BOLT

[76] Inventor: Richard C. Rozanc, R.R. #3, McDonald, Pa. 15057

[21] Appl. No.: 76,506

[22] Filed: Sep. 17, 1979

[51] Int. Cl.$^3$ .............................................. E21D 20/02
[52] U.S. Cl. .................................................. 405/261
[58] Field of Search ................ 405/259, 260, 261, 262

[56] References Cited

U.S. PATENT DOCUMENTS

| 3,940,941 | 3/1976 | Libert et al. | 405/261 |
| 4,194,858 | 3/1980 | Evans | 405/259 |

FOREIGN PATENT DOCUMENTS

| 936082 | 7/1956 | Fed. Rep. of Germany | 405/260 |
| 1288543 | 2/1969 | Fed. Rep. of Germany | 405/260 |

Primary Examiner—David H. Corbin
Attorney, Agent, or Firm—Parmelee, Miller, Welsh & Kratz

[57] ABSTRACT

A mine roof support plate bolt formed from a concrete reinforcing rod has a head and flange at one end and a groove at the other end thereof, the groove forming opposed cutting edges at that end of the rod, and a counterclockwise, arcuate, helical channel in the section of the rod adjacent said other end, the counterclockwise, helical channel communicating with the groove, such that good mixing of resin adapted to secure the bolt in a bore hole is effected, while the cutting edges enable lengthening of the bore hole in instances where the rod would otherwise not pull the support plate flush with the roof structure.

1 Claim, 3 Drawing Figures

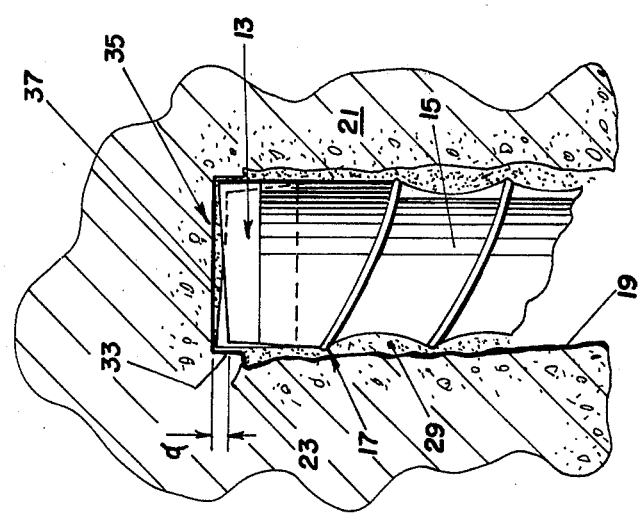
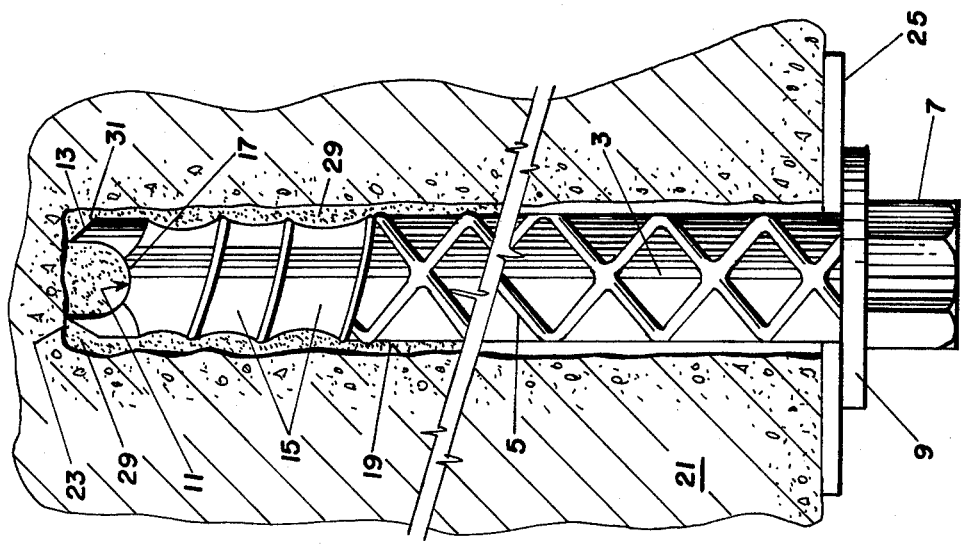
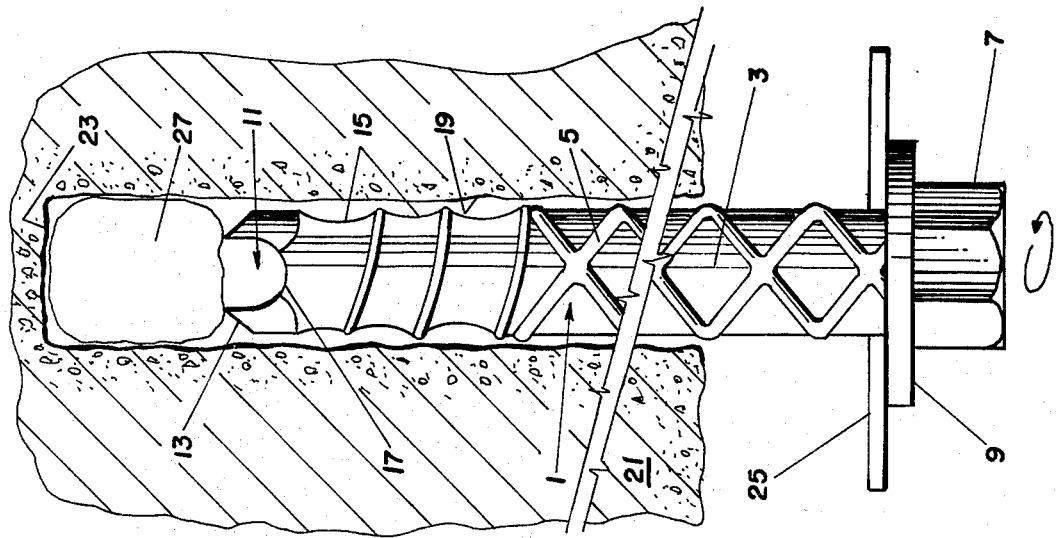

MINE ROOF SUPPORT PLATE BOLT

BACKGROUND OF THE INVENTION

It has been conventional practice to support mine roofs with spaced support plates in order to prevent roof falls and roof fall accidents. Such support plates are generally held flush against the roof of the mine by long bolts or anchors that are inserted into bore holes drilled into the mine roof and fixed therein by mechanical or resin anchoring means.

Where resin anchoring means are used to fix a bolt or rod that supports a mine roof support plate, usually a sleeve is inserted into the bore hole and a threaded bolt is threadedly engaged with the sleeve to support the plate. This has led to the use of various stop members on the bolts or anchors to enable initial rotation of the anchor to burst a resin cartridge previously inserted into the bore hole and enable mixing and setting of the resin to adhesively secure the anchor and a subsequent rotation of the rod to overcome the affect of the stop member, and thread the bolt into the anchor and pull the support plate flush against the mine roof. Such systems, where an anchor sleeve and bolt are both provided, require the formation and machining of dual complex parts and close tolerances between the coacting parts in order to effectively provide for meshing of the various parts and application of the correct torque to the bolt in order to assure safe and secure fixation of the support plate to the roof. Examples of such anchor and bolt systems are shown in U.S. Pat. Nos. 3,877,235, 4,023,373 and 4,122,681 which discuss the coaction of the bolt and anchor as well as the problems associated with, and the need for, strengthening of mine roofs.

Some existing anchors comprise a concrete reinforcing bar having a head and flange on one end that is inserted into a bore hole and adhesively secured therein to support a plate. In another type of anchor bolt where no sleeve is required, a problem exists in assuring that the bolt will be firmly secured within a bore hole and also that the support plate will be fixed flush to the roof of the mine. For example, in U.S. Pat No. 3,940,941, a method for reinforcing roofs is disclosed wherein a metallic bolt is threaded at its lower end, and the upper end has a transverse cut at the top to form a pair of teeth to aid in piercing the resin packages. The threaded portion at the lower end of the bolt has a discontinuity therein so as to enable counterclockwise rotation of the bolt to advance the same into the bore hole and disperse the resin and fix the bolt in the bore hole, and clockwise rotation of a nut on the bolt to thread the nut upwardly and pull a washer carried thereon flush with the roof structure. A dual step operation is required to affix the washer flush with the mine roof, using counterclockwise and then clockwise rotation, and a depending portion of the threaded section remains exposed and extending downwardly from the roof, which could present a safety hazard in low roof areas of a mine.

It is an object of the present invention to provide a unitary mine roof support plate bolt that does not require coaction or relative movement between parts of the bolt system.

It is another object of the present invention to provide a mine roof support plate bolt that requires only a single operation to adhesively fix the bolt into a bore hole and fix a support plate flush with the roof surface.

It is a further object of the present invention to provide a mine roof suppport plate bolt that assures adhesion of the upper section of the bolt within a bore hole by retention of resin adjacent that upper section during insertion and rotation of the bolt into the bore hole.

It is an even further object of the present invention to provide a mine roof support plate bolt which will enable the use of the bolt in bore holes that may be slightly less in depth than that required to accept the bolt and enable pulling of the support plate flush with the mine roof.

SUMMARY OF THE INVENTION

A mine roof support plate bolt for use in resin anchoring of the bolt and cooperating support plate comprises an elongated metallic rod, such as a rebar, having a head at one end and a flange adjacent the head, and a groove formed in the other end of the rod, the groove forming opposed cutting edges at the end of the rod. A counterclockwise helical channel is formed in the rod at the section of the rod adjacent the groove, with the channel terminating in cooperative relationship with the groove. The cutting edges are formed by beveling the ends to the rod on opposite sides of the groove, and preferably the surface of the cutting edges so formed are at an acute angle to the plane normal to the axis of the rod.

BRIEF DESCRIPTION OF THE DRAWINGS

FIG. 1 is a cross-sectional view shown in elevation, illustrating the mine roof support plate bolt of the present invention upon insertion into a bore hole in a mine roof;

FIG. 2 is a cross-sectional view as in FIG. 1 upon fixation of the mine roof support bolt in the bore hole by resin, showing the support plate in supporting position; and FIG. 3 is a cross-sectional view of the upper portion of a mine roof support bolt of the present assembly upon fixation of the bolt in a short bore hole.

DETAILED DESCRIPTION

The mine roof support plate bolt of the present invention provides for efficient and safe fixation of a support plate to a mine roof structure to provide support therefor.

As illustrated in FIG. 1, the support bolt 1 comprises an elongated metallic rod 3 having surface irregularities such as ridges 5 about the surface of the rod. The rod is preferably the type of rod or bar used commercially in the reinforcement of concrete structures and is conventionally known as a "rebar." The rod has a head 7 at one end which may be in a square or other shape that is to be engaged with a tool for insertion of the rod into the bore hole, the head 7 preferably having a flange portion 9.

At the other end of the rod from the head 7 there is a groove 11 formed in the rod, the groove leaving at the end of the rod two cutting edges 13. Formed in the rod, at the section thereof adjacent the groove, is a counterclockwise, helical channel 15. As illustrated, the channel 15, which is preferably an arcuate channel, terminates at the end of the rod in communication with the groove 11, the purpose of which is hereinafter explained, as shown at 17.

In the use of the mine roof support plate bolt of the present invention, a bore hole 19 is first formed in the mine roof structure 21. As an example of the type of bore hole for use with a $\frac{7}{8}''$ rod, the hole would have a diameter of about 1', leaving a 1/16" clearance between the rod and wall of the bore hole. The length of the rod may vary but will generally be on the order of about 5 feet. The bore hole 19 has an end wall 23. The rod 3 is passed through an aperture in a support plate 25, such that the plate will rest on the flange 9 adjacent the head 7 of the bolt. Generally, such support plates are in the shape of a rectangle having a size of about 6" by 16", although the size may vary. A cartridge or capsule 27 of resin, commercially available, which may contain known epoxy or other resin material that requires mixing of two or more components in order to activate the resin and form an adhesive, is first inserted into the bore hole 19, followed by the end of the rod 3 having groove 11 therein. The support plate 25 is supported by the flange 9 at the outer end of the bolt carrying the head 7. Upon insertion of the cartridge 27 of resin to the end wall 23 of the bore hole 19, the rod is rotated in a clockwise direction, as indicated by the arrow in FIG. 1, and torque applied to the rod by a conventional tool (not shown). Upon application of the torque to the rod and forcing the rod further into the bore hole 19, the cutting edges 13 on the end of the rod will shred the cartridge, intimately mixing the adhesive components therein. As the adhesive 29 tends to run out of the bore hole 19 through the clearance between the rod 3 and the wall of the bore hole, the counterclockwise, helical channel 15 will partially restrain the downward flow of the adhesive and drive the same back towards the end of the bore hole, assuring good adhesive contact between the section adjacent the end of the rod 3 and the wall of the bore hole. When the support plate 25 is flush with the surface of the roof structure 21, the adhesive 29 will set, such adhesives generally setting in about a 15 to 20 second time period, with the head 7 and flange 9 of the rod fixing the support plate 25 to the surface to support the mine roof, as shown in FIG. 2.

The cutting edges 13, formed by cutting the groove 11 in the end of the rod 3, are beveled as at 31, with a beveled surface of about 15°, from the surface of the rod to the groove, being preferred. A preferred embodiment for use with a $\frac{7}{8}$" diameter rebar provides that the groove 11 be about $\frac{1}{2}$" wide and between $\frac{1}{2}$" to $\frac{3}{4}$" deep in the end of the rod.

The use of the groove 11 and cutting edges 13 on the end of the rod 3 enables the use of the rod even where the bore hole is of a slightly less depth than that required to bring the support plate carried by the rod flush with the roof surface of the roof structure. As illustrated in FIG. 3, the cutting edges 13 on the end of the rod will act as a drill to deepen the hole by forming a supplemental bore hole 33 in the end wall 23 of initial bore hole 19, the supplemental bore hole 33 having its own end wall 35. To assist in the drilling of the supplemental hole 33 when required, the surface 37 of the cutting edge 13 is angled, with an acute angle indicated as angle α in FIG. 3 provided. Preferably, an acute angle of about 2° to the plane normal to the axis of the rod is provided. Each cutting surface has such an angle with the slope of the angle on one such surface opposite the slope on the other surface. The grindings from formation of the supplemental hole 33 will thus be concentrated in the groove 11 and will not interfere with setup of the resin 29 and good adhesion between the adhesive, rod and bore hole wall.

The present mine roof support plate bolt is also usable where some breakage or separation of the roof structure has occurred due to the ability of the grooved and channeled end of the rod to pump resin upwardly into the bore hole. In such instances, a plurality of cartridges of resin may be inserted into the bore hole and the grooved section of the rod, upon rotation of the rod, will disperse the adhesive formed from the resin upwardly into the bore hole and throughout the upper region thereof to provide adhesion through the structure.

The present mine roof support plate bolt provides an efficient and economical means for supporting the roof support plate flush with the surface of the mine roof while enabling the use of the bolt with bore holes which may be slightly shorter than necessary to accept the bolt. Previously, if the bore hole was slightly short and the plate could not be pulled flush against the roof surface, the operation had to be repeated. The cutting edges and groove of the present bolt enable drilling of a supplementary bore hole the width of the rod with grindings or cuttings from the end wall of the initial bore hole directed into the groove so as not to interfere with good adhesion of the rod with the wall of the roof structure.

What is claimed is:

1. A mine roof support plate bolt for securing an apertured support plate to a mine roof, and designed for use in a preformed hole bored into the mine roof, comprising: a metallic elongated rod having an arcuate surface with irregularities thereon and of a first diameter, with a head and flange at the outer end thereof and an inwardly bevelled inner end having a transverse groove therein, said end having a bevelled surface from said arcuate surface of the rod to the groove, forming spaced cutting teeth along each side of the groove, and having a helical, counterclockwise, channel formed in the rod, directly communicating with said groove, and extending from said groove along a portion of the rod, the diameter of the rod at the area of the channel being smaller than said first diameter, whereby said cutting teeth effectively shread packages of fast setting resin constituents that set-up on mixing and effect thorough mixing of the same, and said channel serves to pump resin constituents upwardly into said groove, through clockwise rotation of said rod, and retard the downflow of said resin constituents while said constituents set-up in said rock structure and about said rod in the mine roof.

* * * * *